US011165782B1

(12) United States Patent
Tayloe

(10) Patent No.: US 11,165,782 B1
(45) Date of Patent: *Nov. 2, 2021

(54) SYSTEMS, METHODS, AND SOFTWARE APPLICATIONS FOR PROVIDING AN IDENTITY AND AGE-APPROPRIATE VERIFICATION REGISTRY

(71) Applicant: Denise G. Tayloe, Woodbridge, VA (US)

(72) Inventor: Denise G. Tayloe, Woodbridge, VA (US)

(73) Assignee: Denise G. Tayloe, Woodbridge, VA (US)

( * ) Notice: Subject to any disclaimer, the term of this patent is extended or adjusted under 35 U.S.C. 154(b) by 81 days.

This patent is subject to a terminal disclaimer.

(21) Appl. No.: 16/658,913

(22) Filed: Oct. 21, 2019

Related U.S. Application Data

(63) Continuation of application No. 14/961,717, filed on Dec. 7, 2015, now Pat. No. 10,469,503, which is a
(Continued)

(51) Int. Cl.
*H04L 29/06* (2006.01)
*G06F 21/62* (2013.01)

(52) U.S. Cl.
CPC ............ *H04L 63/102* (2013.01); *G06F 21/62* (2013.01); *H04L 63/12* (2013.01)

(58) Field of Classification Search
CPC ............ G06F 21/6245; B60R 25/2018; B60R 25/241
(Continued)

(56) References Cited

U.S. PATENT DOCUMENTS 6,729,884 B1   5/2004  Kelton
7,454,508 B2  11/2008  Mathew
(Continued)

OTHER PUBLICATIONS

"AOL Introduces SafeSocial, a New Option for Parents," Submitted by Safe Internet on Sep. 7, 2010; printed from http://safeinternet.org/blog/aol-introduces-safesocial-newoptions-parent (3 pages).
(Continued)

*Primary Examiner* — Baoquoc N To
(74) *Attorney, Agent, or Firm* — Pillsbury Winthrop Shaw Pittman LLP

(57) ABSTRACT

In some embodiments, a first account and a second account may be maintained within a registry system, where the first and second accounts are respectively associated with first and second individuals. As an example, the first individual may be guardian or a legally responsible party for the second individual. Responsive to device identifying information related to the second individual being received by an online service, a request may be received from an entity associated with the online service to determine whether the second individual is registered with the registry. The registry may be queried to determine whether the second individual is registered with the registry based on the device identifying information and information regarding the second individual. Responsive to a determination that the second individual is registered, an indication may be provided to the requesting entity whether the online service is allowed to receive personal information of the second individual.

20 Claims, 5 Drawing Sheets

Related U.S. Application Data continuation of application No. 12/888,252, filed on Sep. 22, 2010, now Pat. No. 9,208,337.

(60) Provisional application No. 61/244,876, filed on Sep. 22, 2009.

(58) Field of Classification Search
USPC .................................................. 707/705, 706
See application file for complete search history.

(56) References Cited

U.S. PATENT DOCUMENTS

| | | | |
|---|---|---|---|
| 7,467,298 | B2 | 12/2008 | Mitchell |
| 7,571,466 | B2 | 8/2009 | Mitchell |
| 7,603,317 | B2 | 10/2009 | Adler |
| 8,370,265 | B2 | 2/2013 | Coulter |
| 8,650,621 | B2 | 2/2014 | Webber |
| 8,793,164 | B2 | 7/2014 | Sendo |
| 8,812,395 | B2 | 8/2014 | Webber |
| 9,208,337 | B2 | 12/2015 | Tayloe |
| 9,928,379 | B1 * | 3/2018 | Hoffer .................... G16H 50/70 |
| 2002/0019828 | A1 | 2/2002 | Motrl |
| 2002/0120866 | A1 | 8/2002 | Mitchell |
| 2002/0184496 | A1 | 12/2002 | Mitchell |
| 2003/0004734 | A1 | 1/2003 | Adler |
| 2003/0051164 | A1 | 3/2003 | Patton |
| 2003/0070100 | A1 | 4/2003 | Winkler |
| 2004/0044628 | A1 | 3/2004 | Mathew |
| 2006/0014654 | A1 | 1/2006 | Varadaraj |
| 2006/0173793 | A1 | 8/2006 | Glass |
| 2007/0078908 | A1 | 4/2007 | Rohatgi |
| 2007/0208868 | A1 | 9/2007 | Kidd |
| 2008/0033740 | A1 | 2/2008 | Cahn |
| 2008/0222271 | A1 | 9/2008 | Spires |
| 2008/0235019 | A1 | 9/2008 | Witzman |
| 2008/0244026 | A1 | 10/2008 | Holt |
| 2009/0055915 | A1 | 2/2009 | Piliouras |
| 2009/0126013 | A1 | 5/2009 | Atwood |
| 2009/0271211 | A1 | 10/2009 | Hammad |
| 2010/0075749 | A1 * | 3/2010 | Seshadri ................. A63F 13/10 463/29 |
| 2010/0114733 | A1 | 5/2010 | Collas |
| 2011/0029622 | A1 | 2/2011 | Walker |
| 2011/0047629 | A1 | 2/2011 | Mitchell |
| 2011/0185399 | A1 | 7/2011 | Webber |
| 2011/0185400 | A1 | 7/2011 | Webber |
| 2014/0101730 | A1 | 4/2014 | Webber |
| 2014/0194196 | A1 * | 7/2014 | Hoy ........................ A63F 13/10 463/29 |
| 2020/0406859 | A1 * | 12/2020 | Hassani ................ B60R 25/252 |

OTHER PUBLICATIONS

"Internet Safety Technical Task Force (ISTTF) Open Meeting," Berkman Center for Internet & Safety; Sep. 23-24, 2008 (11 pages).

"Internet Safety Technical Task Force Technology Submission," Privacy Vaults Online, Inc. d/b/a Privo; Sep. 23, 2008 (4 pages).

"Kid Cards: Protecting Children Through Their Parents," Privo; Sep. 23, 2008 (4 pages).

16 C.F.R. 312.5; Jan. 1, 2003 Edition (pp. 384-385).

COPPA; Children's Online Privacy Protection Act of 1998 (COPPA); 35 U.S.C. 1301 et seq. (11 pages).

Stecklow, Steve; "On the Web, Children Face Intensive Tracking," The Wall Street Journal; Sep. 18, 2019; printed from http://online/wsj/com/article/SB10001424052748703904304574979035231871 46html (6 pages).

Office Action dated Nov. 30, 2018, in U.S. Appl. No. 14/961,717 (16 pages).

Office Action dated Jun. 13, 2019, in U.S. Appl. No. 14/961,717 (9 pages).

Notice of Allowance dated Jul. 29, 2019, in U.S. Appl. No. 14/961,717 (8 pages).

Office Action dated Dec. 18, 2012, in U.S. Appl. No. 12/888,252 (19 pages).

Office Action dated Sep. 11, 2013, in U.S. Appl. No. 12/888,252 (24 pages).

Office Action dated Mar. 7, 2014, in U.S. Appl. No. 12/888,252 (28 pages).

Office Action dated Aug. 25, 2014, in U.S. Appl. No. 12/888,252 (36 pages).

Office Action dated Mar. 23, 2015, in U.S. Appl. No. 12/888,252 (40 pages).

Notice of Allowance dated Sep. 29, 2015, in U.S. Appl. No. 12/888,252 (35 pages).

* cited by examiner

SYSTEMS, METHODS, AND SOFTWARE APPLICATIONS FOR PROVIDING AN IDENTITY AND AGE-APPROPRIATE VERIFICATION REGISTRY

CROSS-REFERENCE TO RELATED APPLICATIONS

This application is a continuation of U.S. patent application Ser. No. 14/961,717, filed Dec. 7, 2015, which is a continuation of U.S. patent application Ser. No. 12/888,252 filed Sep. 22, 2010, which claims the benefit of U.S. Provisional Patent Application No. 61/244,876, filed Sep. 22, 2009, each of which is incorporated herein by reference.

FIELD

This application generally relates to systems, methods, and software applications for providing an identity and age-appropriate verification registry.

BACKGROUND

Children increasingly have access to many websites and online services that may require them to legitimately share personal data or may bring them into contact with inappropriate content, commerce and/or malicious adults. Alternately, websites are emerging that are attempting to provide "youth only" communities which require some level of assurance that the registered user is a child.

In July 2006, the Federal Trade Commission (FTC) shared with Congress its concern about potential danger to children who visit social networking Web sites. In testimony before the House Committee on Energy and Commerce Subcommittee on Oversight and Investigation, FTC Commissioner Pamela Jones Harbour said there is a "need for social networking Web sites—individually, collectively, and, most importantly, expeditiously—to develop and implement safety features to protect children who visit their sites and empower parents to protect their children when they do so." "Because the information that children post on their online journals, web logs or 'blogs' can be accessed by other Internet users, social networking Web sites raise heightened privacy and security concerns. In particular, sexual predators may use the information that children provide on social networking sites to identify, contact, and exploit them, unless these sites are constructed to reduce access to this information, or users themselves take steps to limit unwanted access." "The social networking industry has a clear incentive to create a safe online community," Harbour said.

To reduce that threat, many websites and online service providers have attempted to, or by regulation have been required to, provide age-restricted access. However, this requires online operators of websites and services to determine the age of site visitors with reasonable assurance while staying in conformance with applicable laws. Typically, this is provided via consent age-agreements, which users may select to indicate they are of certain age. Children, though, are savvy enough to simply disregard such precautions by lying about their age in order to gain access to restricted content or services. In addition, predatory adults can easily claim to be children in order to contact and communicate with children.

The Children's Online Privacy Protection Act of 1998 (COPPA), 35 U.S.C. §§ 1301 et seq. was passed by Congress to address the online collection of personal information by persons or entities under U.S. jurisdiction from children under 13 years of age. It details what a website operator must include in its privacy policy, including when and how to seek verifiable consent from a parent or guardian for a child, and what responsibilities an operator has to protect children's privacy and safety online including restrictions on the marketing to those under 13.

An "email plus" mechanism has been promulgated by the FTC which allows online operators to use email coupled with additional steps to provide assurances that the person providing the consent for the child is the parent. See 16 C.F.R. § 312.5(b)(2). Such additional steps include: sending a confirmatory email to the parent following receipt of consent; or obtaining a postal address or telephone number from the parent and confirming the parent's consent by letter or telephone call. Operators who use such methods must provide notice that the parent can revoke any consent given in response to the earlier email.

However, even this mechanism has not proved successful, as children simply falsify age, without the parent's knowledge. A website operator has little evidence (if any) to know otherwise, or to investigate or act further.

Parents want to be able to selectively restrict their child's access to entire websites and/or certain functions (e.g., chat or posting images) at an online service. Yet, parents may have very few limits to control their children's access on the Internet. Website filtering and blocking software alone has not proved to be very successful. Moreover, parents are concerned with their children providing personal information online (or to other entities) which may be made public.

SUMMARY

According to an aspect, systems, methods, and software applications provide an identity and age-appropriate verification registry. The systems, methods, and software provide children, parents and businesses powerful new tools to make informed decisions that ultimately protect children online.

There are a variety of reasons why parents want to restrict children from certain websites, online content and online/mobile services. Some content, products or services may be wholly inappropriate for any child (such as pornography, tobacco and alcohol related sites, illicit drugs, etc.). Other content or online services—which may not be appropriate for young children—might be appropriate for older children, adolescents and/or young adults. Parents may be in the best position to determine what content is age-appropriate for their children. Moreover, parents want to restrict or limit their children's ability to provide personal information online or other data (or to other entities) which may be shared or become publicly available, or worse, to a predatory adult.

Businesses and other entities may also want (or need) to restrict access to certain Web content and online or mobile services; advertising, outbound marketing communication and social media. These may be based on company-imposed restrictions based on terms of use; parental restrictions, and/or imposed by law or regulatory requirements.

According to an aspect, the system may provide tools that enable parents and businesses to determine whether children have attempted to defeat age restriction limitations. These tools may provide significant protection for a broad age range of children by giving parents and businesses a mechanism to provide identity and age information verification. As such, harm to children may be prevented by restricting children from accessing age-restricted websites, content, products or services. In addition, businesses may be provided with reasonable assurance that children are not accessing age-restricted content or services and/or disclosing information that could be shared or become publicly available.

According to an aspect, advertisers or marketers may have tools to verify identities and age, so as to deliver age appropriate access, content and advertising within the confines of social pressure and applicable regulations and laws. For instance, "pinging" and "scrubbing" tools may be provided for user identity and age-appropriate verification. This enables businesses to limit access to only age-appropriate individuals, thereby reducing inappropriate access and delivery of content and marketing materials to those "under age." "Pinging" is to real-time identify under age individuals. "Scrubbing" is to filter or remove under-age individuals from a targeted audience.

According to an aspect, a system may reside on a computer-device, such as a server, for providing a real-time identity and age-appropriate verification registry which includes an application having a plurality of modules, including but not limited to, a registration module, an identity and consent credentials module, a parental management module, a third party requestor module, and a request processing module. The application may interface with one or more additional systems, such as a registry database for maintaining parent and child information records. Various individuals or other parties may interact with the application via computer devices, such as personal computer, laptop computer, Smart Phones, PDAs, etc. Users may include parents, children, other parties who may provide information used in the registration process, and third party requestors seeking identity and age-appropriate verification. For instance, the system may enable a third party requestor to query or otherwise search the registry to determine if an individual is registered and if so, provide: (a) an indication to the requesting entity that the registered individual is of a sufficient age to access information of the requesting entity, and/or to disclose information which could be shared or become publicly available by the requesting entity; and/or (b) the age, age range, or date or birth of the registered individual to the requesting entity.

According to an aspect, a registration module may be configured to allow parents and/or their children to register an "account" and create a record with the registry. In one implementation, a multi-step registration method may require input and confirmation by parents and children (or vice-versa) to minimize fraudulent registration. In some implementations, the parent may override the child's decisions with regards to registration. In some implementations, the child may be able to sufficiently identify themselves to create their own verified identity for access to age restricted communities and services. This may or may not require parental notice for registration. Individual accounts may include information for the registered individual, such as, for instance, one or more identifiers of the individual for identifying the individual. This information may also include a date of birth (or age) of the individual for age-verification purposes A parent registration process may enable parents to create an account for themselves as well as for registering one or more children. Parents may be requested to provide identification information of themselves and one or more of their children. For security reasons and to prevent unauthorized users, parents may have to provide one or more identity and consent credentials to verify who they say they are, and they have authority to consent on behalf of the child. A notification may then be transmitted to each child identified, letting the child know that their parent has requested he/she (the child) to be registered. The child may have an opportunity to respond. For instance, the child may confirm that the requestor parent is in fact his/her parent, and if so, accept or decline to participate in the registry. A child's indication that the requestor is not his/her parent may indicate fraud preventing the child from agreeing to participate and requiring further follow-up. Parents may have an option to override their children's decision not to participate. In any event, the child's decision is communicated to the parent.

A child registration process may enable a child to create an account and register, subject to parental consent which may be through notice with the right to opt-out or affirmative opt-in. To register, children may be requested to provide identification information of themselves and their parents. Registration may be subject to parental or third party approval, in some instances. For example, a school system may return an answer to the registry system (e.g., real-time or manually), that authorizes the creation of a student-based identity and age credential. In other instances, a parent may later provide an identity and age credential on behalf of the child. A notification may then be transmitted to the parent identified letting the parent know that their child has requested to be registered. The parent may have an opportunity to respond. For instance, the parent may confirm that he/she is in fact the child's parent. For security reasons and to prevent unauthorized users, parents may have to provide one or more identity credentials to verify who they say they are and that they have authority to consent on behalf of the child. A parent's indication that the requestor is not his/her child may indicate fraud, preventing the child from agreeing to participate and requiring further follow-up. Parents may further have an option to allow their children to register. Alternatively, parents may also have an option to override their children's decision and prevent their children from registering. The parent's decision may (or may not) be communicated to the child.

In some implementations, the registration process may be initiated through a third-party's website. For instance, in creating (or using) an email account for a child, the email provider may provide options to enable registration of the child. This may include a check-box or link to initiate the registration process and to opt-in for registration also.

According to an aspect, age-sensitive or age-restricted online services and social networks may be provided with tools to compare registration attempts against the registry. The system may analyze attempted registrations and cross-references for matches against the various fields in the registry database. For instance, the registry can take a purported date-of-birth (or age) of individual and compare it with a stored date-of-birth (or age) associated with the registered account for that individual. Thus, if a child attempts to gain access to an age-restricted website or other content site by falsifying his/her age, such attempts can be identified and thwarted. Moreover, the child's parent or guardian can be notified of the child's action.

According to an aspect, when an "at risk registration" is identified by the registry, the registry returns to the participating website the associated age attribute, and if applicable, the requested parental override. The participating site or content provider can use that information to invoke its terms of use and its regulatory requirements (e.g., COPPA requires parental consent for children under the age of 13). If necessary, the website may temporarily suspend the registration process and notify the registry provider. The registry provider would then alert the parent.

According to an aspect, the tools may provide reasonable methods and techniques, in light of existing technologies, to ensure the third parties, such as content providers and other entities, that the parent is the actual parent (or legal guardian) of the child. This may be a "sliding scale" based on potential harm and fraud. For instance, if purported child and/or parent blocks access for the child to particular content and distribution of the personal information, the restricted operator and/or the third party may choose not to inquire further, since it is unlikely that a parent or child would fraudulently attempt to block access to content and restrict distribution of personal information. Moreover, blocking access to content and refusing to receive or distribute any personal information altogether without further inquiry, errs on the side of caution.

On the other hand, additional verification may be required when the parent and/or child authorizes access to content or distribution of personal information. Indeed, these situations may be a more likely potential for fraud, as the purported parent or child may not necessarily be who they claim to be. For instance, children could purport to be parents, and/or adults may purport to be children. To ensure against these situations, additional identity verification may be necessary. The degree of additional verification may vary based on the circumstances and/or potential harm to the child. The more identity verifications, the greater the likelihood that the person is who he or she claims to be. Of course, there may be a trade-off in terms of information available, timeliness, and harm to child, among other things. According to an aspect, the registry operator and/or third parties may decide what level of additional verifications may be taken. This may be discretionary on behalf of the registry operator and/or third parties. The sliding scale may be implemented depending on the circumstances, such as the specific content, personal information collected, applicable laws or regulations, potential degree of harm, etc.

According to an aspect, third parties may accept the stored verifications for the parent or child from the registry. In some instance, the requesting entity may request from the registry confirmation of one or more credentials, as well as, the methodology or techniques used for verification of the credential information associated with an individual. As such, requesting entities can determine, for themselves, whether to rely on the verified credentials or to conduct additional inquiry. However, a third party may commence with its own independent verification techniques, and/or request the registry operator to provide additional verification of credentials of an account holder. In some instances, verifications from multiple third parties may be collected by the registry operator for later use.

According to an aspect, parents may be given options (i) to provide consent for their child to be registered at the website, view or access content, or share personal information; or (ii) to deny consent for their children to do so. As such, online service providers and other businesses may have actual knowledge of parental consent and take action accordingly. This consent may or may not relate to the child's ability to deliver personally identifiable information. Of course, even when consent is given, the third party should still prevent the access to age-sensitive content and/or distribution of personal information to the extent necessary to avoid breaking the law. For instance, a content provider cannot lawfully allow a child to access age-restricted content, even if the parent were to consent on behalf of the child. To reduce fraud, one or more consent credentials may be required to confirm that a purported is parent can consent on behalf of a child.

According to an aspect, a secure, scalable, and cost-sensitive system which allows a parent or guardian to put organizations (subscribing or non-subscribing) on actual or constructive notice of the need to protect or turn away from registration that data which may be associated with a minor child is provided. In some implementations, the system provides tools that allow parents to alert third parties that their children are not to access (or that they can access) content or to provide personal information thereto with or without the prior inquiry by the third party. The system can send out notification to third parties, for example.

According to an aspect, the system may allow parents to manage their children's access to age restricted content, products and services whether the age restriction is company imposed through terms of use, parent restricted by overriding a company's terms of use, or imposed through statutory or regulatory requirements.

According to an aspect, the system may enable a user to check for the existence of a registered account without passing information from which the account can be extracted. This protects the security of the registered data as well as security of the membership information. In order to reduce the opportunity for fraudulent and/or abusive registration of accounts as a minor child's account, the owner of the accounts may first have to establish an account with the registry. In some implementations, a third party requestor can request the parent contact information or confirmation of parent contact information for the purpose of processing its own consent with the parent.

According to an aspect, the system may ensure compliance and/or safe harbor within the context of COPPA. For example, the system may allow parents and other custodial individuals the ability to proactively provide "actual or reasonable knowledge" to participating third parties that specific accounts have been identified as those of minors. The system may also provide individuals and companies with the ability to provide age and identity component verification as part of account service offering or registration processes.

In some implementations, the system may also provide "verifiable parental consent." Consent may be given by the parent, for instance, by electronic confirmation, actual signature, electronic signature, or other consenting methods. Different consenting methods may vary accordingly from jurisdiction to jurisdiction (i.e., by country, state, or city). In some instances, signed consent may be compared to a stored signature for verification. Other consent verification techniques are also possible.

COPPA defines "child" as an individual under the age, and limits its protection to children under the age of 13. However, it will be appreciated that child, as used herein, is not to be limited to individuals under 13, and may include individuals under the age of majority, age of consent, drinking age, or other age-appropriate criteria generally associated with children (e.g., above and below the age of 13), adolescents or young adults.

According to an aspect, in certain situations, the system may act in loco parentis ("in the place of a parent"). For instance, with the parent's consent, the system may act as an agent or instrument on behalf of the parent. And, in some implementations, the system may automatically and actively protect children's interests online.

According to an aspect, the system can notify third parties, whether a child has attempted to obtain access to content or not, or that a particular child should not be given access to the site. Such notification may put the third party on notice that this particular child user should not be given access to this site at all.

While the disclosed embodiments may refer to "parent" and "child," it will be appreciated that the systems, methods, and software may be used by parents, guardians and/or other responsible adults and other persons to provide prior authorization and consent on behalf of children to access age-sensitive content, products or services, and/or disclose personal information or other data (or to other entities) which may be shared or become publicly available. The registry may inform third party requestors of the parental authorization and consent on behalf of the child.

According to an aspect, the system may accommodate both real-time and batch processing of one or more requests.

These and other aspects of this disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment, the structural components illustrated herein are drawn to scale. It is to be expressly understood, however, that the drawings are for the purpose of illustration and description only and are not a limitation of the invention. In addition, it should be appreciated that structural features shown or described in any one embodiment herein can be used in other embodiments as well.

DETAILED DESCRIPTION

Figure 1:
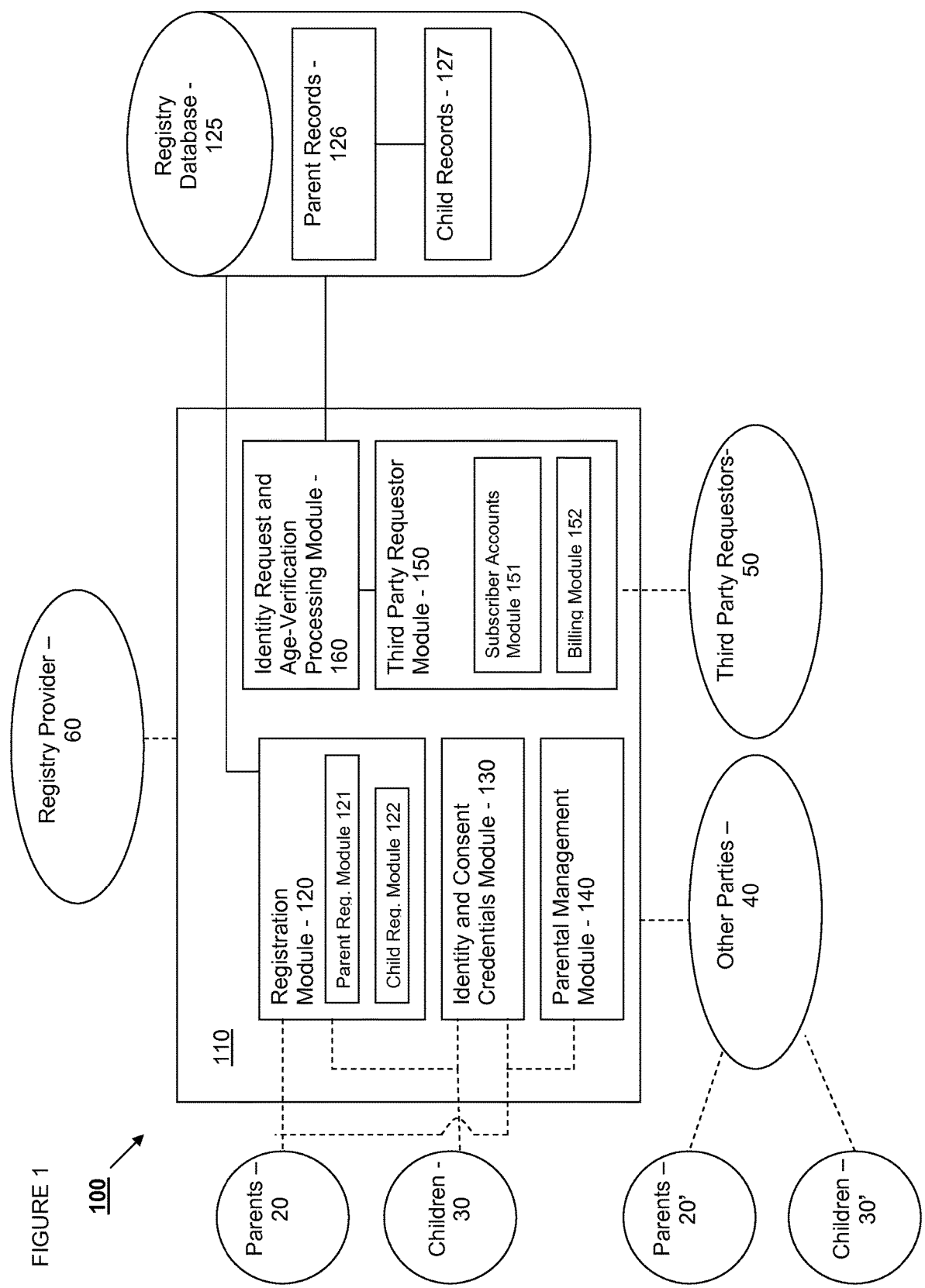
FIG. 1 is an exemplary system architecture for providing identity and age-appropriate verification registry.

FIG. 1 is an exemplary system architecture 100 for providing identity and age-appropriate verification registry. According to one or more embodiments, system 100 may include one or more electronic or computer systems. For example, in one implementation, system 100 may be configured as a client-server architecture, as further described below with respect to FIG. 2.

The system 100 may include an application 110 having a plurality of modules, including but not limited to a registration module 120, an identity and consent credentials module 130, a parental management module 140, a third party requestor module 150, and an identity request and age-verification processing module 160. One or more of the modules (and/or the functionally thereof) of application 110 may be combined and/or include additional modules.

The application 110 may interface with one or more additional systems, such as a registry database 125 for maintaining parent records 126 and child records 127.

Various individual or other parties may interact with application 110, for instance, using various electronic or computing devices (as discussed below). These users may include parents 20, children 30, other parties 40 who may provide information used in the registration process, and third party requestors 50 seeking identity and age-appropriate verification.

Registry provider 60 may maintain and/or operate application 110. Registry provider 60 may be an individual, company or other entity. In some implementations, registry provider 60, or its agents (e.g., employees, affiliates, contractors, etc.), may interact with the other individuals or parties discussed herein.

According to one embodiment, the application 110 may be software (firmware) created using any number of programming languages. Of course, it will be appreciated that any number of hardware implementations, programming languages, and operating platforms may be used. As such, the description or recitation of any specific hardware implementation, programming language, and operating platform herein is exemplary only and should not be viewed as limiting. The application 110 may be stored on a computer- or machine-readable storage media having computer or machine-executable instructions executable by one or more processors. Application 110 may also be implemented as a programmable processor, such as, for example, a field-programmable gate array (FGPA) or an application-specific integrated circuit (ASIC) processor. Processors might also be virtual servers, web services, or so-called "cloud" computing services. In one implementation, the application 110 may reside on a memory device of one or more electronic or computing devices. Such devices may include, for instance, personal computers, laptop computers, so-called "Smart Phones" (e.g., Apple's iPhone, RIM's Blackberry, etc.), personal digital assistants (PDAs), tablet computers (e.g., Apple's iPad), and the like.

The registration module 120 is configured to allow parents 20 and/or children 30 to register an account (or individual record) with the registry. This may include initially creating an account and/or updating and modifying account information. Both parent and children may each have a separate account (but not required in all instances). The registration processes may be different for parents 20 and children 30. These processes may be performed, respectively, by parent registration module 121 and child registration module 122. To reduce fraudulent registration and unauthorized users, a multi-step registration process may be provided requiring information that may be needed from parents and their children (or vice-versa). Various communication means may be used to communicate by the registration modules and/or transmit notification back and forth between parents and children.

The parent registration module 121 may be configured to enable a parent to create an account (i.e., parent record 126) and register one or more of their children. Parents may create their own personal parental account which allows them to provide the registry with their children's personally identifiable information. A "sliding scale" of identity verification may be performed to improve the integrity and assurances of the service.

Parent registration data may include parental identification information and/or notification information. Some information may be overlapping. Each parent account may include a unique identifier for each parent, for uniquely identifying that parent. For instance, the unique identifier may include (or be associated with) a social security number. This may include the entire social security or a part thereof (e.g., the last four digits). Alternatively or additionally, the unique identifier may also include a name, a physical address, machine address or identifier, government issued identification number (e.g., driver license or passport numbers), email address, user name, login name, telephone number, instant messenger (IM) or social networking site screen names, universal identity credential (discussed below) such as an i-card, etc. Custom identifiers are also possible, similar to user names. In addition, parental information may include a list of or more alternative or alias identifiers, in addition to the unique identifier. Thus, a parent may be located in the registry, for instance, by searching various identifiers.

Parental information may include, but is not necessarily limited to, one or more of: name (e.g., common name, middle name, surname), marital status, custodial status (e.g., legal custody, joint custody, guardian, etc.), gender, date of birth (DOB), children's names, ages and other information, relationship to each child registered (e.g., mother, father, or guardian), physical address(es)—including home and/or work,—photographs, etc. Notification information may include, but is not limited to address(es), phone number(s)—including home, work and/or cell, email address(es), or Instant Messenger (IM) or Social Network screen name(s).

A parent also may create (or edit) an individual login, PIN or password for securely accessing the system for themselves and/or each of their children registered. Biometric information, such as fingerprints, might also be used. The system may allow for second factor authentication for security purposes. Additional security questions may also be requested for later verification and security purposes (such as mother's maiden name), if necessary.

Child registration data may include a child's identifying information, and/or notification information about the child. Some information may be overlapping. Each child account may include a unique identifier for each child, for uniquely identifying that child. For instance, the unique identifier may include (or be associated with) a school identification (ID) number/code or a social security number. This may include the entire social security or a part thereof (e.g., the last four digits). Alternatively or additionally, the unique identifier for the child may also include a name, a physical address, machine address or identifier, government issued identification number (e.g., driver license or passport numbers), email address, user name, login name, telephone number, instant messenger (IM) or social networking site screen names, universal identity credential (discussed below) such as an i-card, etc. Custom identifiers are also possible, similar to user names. In addition, child information may include a list of or more alternative or alias identifiers, in addition to the unique identifier. Thus, a child may be located in the registry, for instance, by searching various identifiers.

Child information may include, but is not necessarily limited to, one or more of: name (e.g., common name, middle name, surname), parents' information, siblings' information, gender, date of birth (DOB), physical address(es)—including home and/or work—photographs, etc. Notification information may include, but is not limited to address(es), phone number(s)—including home, work and/or cell, email address(es), or Instant Messenger (IM) or social network screen name(s), school name, personal website URL, etc.

In some implementations, a child may create (or edit) an individual login and password for accessing the system. Biometric information, such as fingerprints, might also be used. Parents may be notified of their children's login and passwords, and access (or edit) their children's contact or notification information. Also, parents may have the ability to limit the ability of children to create (or edit) login and password.

More detailed identifying information could also be stored, such as, Internet Protocol (IP), router, media access control (MAC) addresses and/or other physical device address for computers and other electronics, for which the parent and/or child uses This may be entered by the parent (and/or child) or automatically captured by the registration module 120. Use of the same machine(s) by a parent or child may be further used for identification and/or verification purposes.

In some implementations, registration module 120 may require confirmation of certain parental or child information. For example, the registering individual, another register individual, and/or a third party entity, may receive a notification, or otherwise be prompted, to provide confirmation, during the registration process, of the registering individual's personal information. The verifying entity may include, for instance, an individual person, business, company, corporation, partnership, or any other organization. In some implementations, as described below, a parent may confirm a child's registration (or vice-versa). And, in some instances, the third party verifying entity may be a teacher, a school or other educational facility, a clergy member, a house of workshop (e.g., church, synagogue, temple, etc.), a relative or family member, a friend, a co-worker, an employer, organizational group, (youth), athletic league, government agency, police officer, parole officer, judge, attorney, doctor or nurse, or any other person or entity who may know, and/or can vouch for the registering individual.

For example, the registration module may be configured to generate a notification to an entity to confirm the identity, the identifier, the age, the date of birth, or other personal information of the registering individual during the registration process. In some implementations, the notification may be provided by one or more of: mail, fax, telephone (e.g., cellular and/or landline), video-link, in-person meeting, email, Instant Messenger (IM) text message, social media and networking site messaging, or other communication means.

To create an account (i.e. child record 127) for registering a child via parent registration module 122, parents may be requested to provide identification information of themselves and one or more of their children. For security reasons and to prevent unauthorized users, parents may have to provide one or more identity and consent credentials to verify who they say they are, and they have authority to consent on behalf of the child. A notification may then be transmitted to each child identified letting the child know that their parent has requested he/she (the child) to be registered. The child may have an opportunity to respond. For instance, the child may confirm that the person registering the child is in fact his/her parent, and if so, accepts or declines to participate in the registration. A child's indication that the one attempting to register the child is not his/her parent may indicate fraud or an authorized user, preventing the child from registering and requiring further follow-up. Parents may have an option to override their children's decision not to participate. In any event, the child's decision may be communicated to the parent.

The child registration module 122 may be configured to enable a child to create an account and register subject to parental consent or other third party authentication. To register, children may be requested to provide identification information of themselves and their parents. Registration may be subject to parental approval. A notification may then be transmitted to the parent identified, letting the parent know that their child has requested to be registered. The parent may have an opportunity to respond. For security reasons and to prevent unauthorized users, parents may have to provide one or more identity and consent credentials to verify who they say they are and that they have authority to consent on behalf of the child. A parent's indication that the person attempting to register is not his/her child may indicate fraud or an unauthorized user, preventing the child from registering and requiring further follow-up. Parents may further have an option to allow their children to register. Alternatively, parents may also have an option to override their children's decision and prevent their children from registering. The parent's decision may (or may not) be communicated to the child.

In some implementations, there may be a fee for registering a parent or child. Fees could be based per person (e.g., child or person), or a family plan (e.g., two or more children). Additional fees could also be charged for maintaining registration of child. These could be charged on an annual basis or for longer intervals. Different fee structures may be provided.

In some implementations, the registration process may be initiated though a third-party's website. For instance, in creating (or editing) an email account for a parent or child, email providers may provide options to enable registration of the parent or child. This may include a check-box or link to initiate the registration process and to opt-in for registration also. Parents 20' and children 30' may, alternatively or additionally, register with the registry through another party 40. In some cases, a telecommunications carrier, email provider or social networking site may offer an option for its users to register with the registry database 125. A user might be able to register with that site and with registry database 125 simultaneously, or at different times. An application programming interface (API) form may be used for collecting data, for example. Some or all of collected data may be forwarded to the registry provider 60 for creating an account with, and/or updating an account with registry database 125. In other instances, the another party 40 may provide a "portal," link or other gateway to the registry database 125.

Registration information including parent records 126 and child records 127 may be stored in a registry database 125. Registry database 125 may store parent and child account records and/other identification data.

In one implementation, parent records 126 and child records 127 may be stored separately, yet linked. For instance, one or more child records 127 are linked to each parent record 126 in the registry 125. In some instance, a mother and father might have separate parent records 126 that are linked to each other, was well as to their children's' records. Family records are also possible.

In one implementation, registry database 125 may be a relational database with a one-to-many and/or many-to-many relationship for records. For instance, unique individual records for children and parent may be stored in registry database 125, and linked so that parent records 126 are associated with their children's records 127. Similarly, child records 127 may be linked to corresponding parent records 126. In some implementations, child records 127 may also be linked to non-related parent records 126 or child records 127 (e.g., friends' records, or other records). Moreover, other relatives, such as a grandparent, aunt/uncle, or step-parent could be linked to a particular child and/or parent.

Given the personal nature and sensitivity of the information being stored, precautions may be taken to protect the integrity of the data and access thereto. These may include encryption, authentication, or other security measures, as known in the art.

The identity and consent credentials module 130 may be configured to enable parents or children to verify who they say they are and that they have the ability to provide consent for themselves or their children.

Notification may be provided to the parent to provide one or more credentials. Credentials may be one or more of identity-based, knowledge-based, control-based, and contextual-based. The credentials may be provided both online and offline. The more credentials which are verified, the greater the likelihood that parents (and children) are in fact who they claim to be. In some implementations, the parent may provide attributes about themselves that the consent credential module 130 then goes about verifying as a whole or attribute-by-attribute. The verification methodologies utilized may be implemented and delivered on a sliding scale of reliability and will rely on reasonable methods in light of available technology.

Identity based credentials are to verify the identity of a child or parent, based on accurate and reliable information. These may include, full or partial social security numbers (SSN), passport number, driver's license number, credit cards, bank accounts, etc. Identity based credentials may be readily confirmed by government agencies, banks, financial institutions, credit bureaus (e.g., Experian, Transunion, and Equifax), etc. For instance, SSNs may be verified via the Social Security Administration database, passport numbers to the Passport Office and a driver's license number may be screened via a state department of motor vehicle agency which issued it. Legal custody information might be verified via court records or other legal documents (e.g., birth certificates, divorce decrees, custodial orders, wills, etc). Physical identity credentials might also be considered including, fingerprints and/or other biometrics, signatures, voice samples, photographs, etc.

Knowledge-based credentials may also be utilized, for which only a parent may likely know the answers with respect to themselves and their children. This may include their children's schools, children's teachers' name(s), children's pastor, priest, or rabbi, organizations their children are involved with (e.g., boy scouts, or girls scout troops). Both parents and children may also be able to generate security questions for the other to answer. These may be of a personal and/or familiar nature for which only the other is likely to know. For example, for a parent to answer, what is the name of your daughter's favorite doll? Or, for a child, what gift did you give dad for his birthday last year?

In some implementations, for added security and assurance, the parent may have to demonstrate control-based credentials to prove they have control over their children. These may include showing control of a cell phone or email address being registered to a child. For example, for the child's cell phone, the parent may make a call using the child's cell phone to the registry provider 60 which may confirm the parent's use on through a "caller id" function. Similarly, for the child's email, the parent may login to the child's email and send an email message to the registry provider 60 which may confirm the parent's use. Other control means could also be used such as, for example, the parent providing a copy of a cell phone bill or a registry account holder texting a message to the registry from their cell phone.

Contextual-based credentials may be used to confirm and/or infer that the parent or child is who they purport to be. These may include, but are not limited to, considering physical connections, timing, and/or informational content. Physical connections may include confirming that the computer or electronic address (or number) of a machine (e.g., IP, router, MAC address, etc), being used by purported parent or child is one that is most often associated with that parent or child. In addition, "cookies" or other electronic identity tracking means may be employed for tracking parents or children. Timing may also be considered. For instance, online activity by a child in "the middle of the night" or during normal "school times" might be indicative that a user in not a "young" child. Emails or telephones calls from a work email or phone number during normal business hours, associated with a parent record, may be probative they are from the actual parent. Web activity and history may also be considered. For instance, web browsing may be monitored. Alike age-appropriate content which has been previously viewed by the child and consent to be a parent, is not likely to raise suspicion. However, new requests for age-restricted content may cast suspicion.

According to an aspect, the tools may provide reasonable methods and techniques, in light of existing technologies, to ensure the third parties, such as content providers, that the parent is the actual parent (or legal guardian) of the child. Likewise, similar tools may be provided to ensure that children are actual children and not predatory adults. This may be a "sliding scale" based on potential harm and/or fraud. For instance, if the asserted or purported child and/or parent blocks access for the child to particular content and distribution of the personal information, the registry operator and/or the third party might choose not to inquire further, since it is unlikely that a parent or child would fraudulently attempt to block access to content and restrict distribution of personal information. Moreover, blocking access to content and refusing to receive or distribute any personal information, altogether, errs on the side of caution. A notification, for instance, might later be sent to the parent or child to confirm the blocking.

On the other hand, additional verification may be required when the parent and/or child authorizes access to content or distribution of personal information. Indeed, these situations may be more fraught with the potential for fraud, as the asserted or purported parent or child may not be necessarily who they claim to be. For instance, children could purport to be parents, and/or adults may purport to be children. To ensure, against these situations, additional verification may be necessary. The degree of additional verification may vary based on the circumstances and/or potential harm to the child. The more identity credentials confirmed or verified, the greater the likelihood that the person is who he or she claims to be. Of course, there may be a trade-off in terms of information available, timeliness, and harm to child, among other things. According to an aspect, the registry operator and/or third parties may decide what level of additional verifications may be taken. This may be discretionary on behalf of the registry operator and/or third parties. A "sliding scale" may be implemented depending on the circumstances, such as, the specific content, the personal information collected, applicable laws or regulations, potential degree of harm, etc.

Identity and credential verification may include various means. For instance, the registry database may be queried to determine a match of a store credential. In other cases, the registry system may provide video capabilities which interact with a video camera associated with the parent or child, such as on a typical computer or smart phone. Thus, the registry operator or its agent can "visually" see the parent and confirm his or her identity (with a photograph on record). This may include a video-link for video conferencing. Similarly, the registry operator or its agent might converse via telephone (to hear an adult voice) or perhaps converse, via email, a chat application, or other media to ask questions or make other inquiries. In-person contact or visits between the registry operator (or its agents) and parent and/or children may also be possible to verify identity and credentials. In one or more instances, the identity and credential verification may be documented, for quality assurances, and for later auditing (if requested).

Parental managing module 140 may be configured to provide tools to enable parents to manage their children's access to age restricted products and services. For instance, parents may select age-appropriate content for viewing, content categories, and/or particular sites for which their children may view and/or share personal information. The system may thus enable a registered child to browse content based on the parental consent without further inquiry from either parent or child. Of course, even when consent is given, the third party should still prevent the access to age-sensitive content and/or distribution of personal information to the extent necessary to avoid breaking the law. For instance, a content provider cannot lawfully allow a child to access age-restricted content, even if the parent were to consent on behalf of the child.

In addition, parents may identify content and/or specific Web or other online sites which they do not want their children to access. The system would block access to the registered child for this content.

Consent may be given by parent for children, a priori, for instance, by electronic confirmation, actual signature, electronic signature, or other consenting methods. Different consent methods may vary according from jurisdiction to jurisdiction (i.e., by country, state, or city).

This may be in addition to whether an age-restriction is company—imposed through terms of use (TOU), parent-restricted by overriding a company's terms of use, or imposed through regulatory requirements.

Parents may receive notification of their children's attempts to register for websites and other online services, once the child is identified by a third party and verified by the identity request and age-verification processing module 160. Parents may allow or deny their children access.

In some implementations, the system may post data. Some wireless carriers, for instance, may store age data, but carriers do not know who is actually using the phones (especially, if there are more than one phone per account). As an example, a parent may register a cell phone and the system transmits or pushes that information to the phone carrier so that controls can be updated on the carrier side. The wireless carrier can then filter content based on the parental control settings provided via the parental managing module 140. Parents thus, would not have to separately go to the carriers' sites to establish the basic account information (including age). It may be also possible to allow a person to verify adulthood and push that information to the carrier so that content providers could ask for age verification based on the verified cell status.

In some implementations, parental managing module 140 may be configured to generate a universal identity credential used for authentication purposes, Information Card (i-card), an open ID or other common authentication protocol for identifying themselves and/or for use by their children.

Information Card (i-Card)

One way for a child or parent to create a unique identifier which may be used with the registry is by using an i-card. I-card technology is based on a set of network protocols (e.g., WS-Trust) and security token data formats (e.g., SAML 1.1). These standards are the key to i-card interoperability, and have been made available on an open, royaltyfree basis. Various commercial and open source i-card software rely on these protocols to achieve interoperability. In June 2008, the Information Card Foundation was launched by leading implementers of i-card technology including Microsoft, Google, PayPal, Equifax, Novell, and Oracle.

I-cards are enabled by an identity selector that may be integrated with a user's browser on their computer or mobile device. This selector acts as a kind of digital wallet holding a set of visual i-cards. Both commercial and open source selectors are available today in versions compatible with Microsoft Internet Explore (IE), Firefox and Safari browsers and compatible with Microsoft Windows™, Apple OSX™ and Linux operating systems. The CardSpace™ selector ships with Microsoft Vista™ and has been available since early 2007. Other commercial selectors are available from Novell (DigitalMe™) and Azigo.

Parents may be able to create an account for an i-card for themselves and their children. The parent may create a set of records for each of their children. I-cards may store detailed personal information for a child that is linked to the parent. These linked child records may include identifying information about the child such as name, date of birth, etc. The parent's account on registry not only provides the linkage between their own identity and that of their children, but also provides a set of parental control pages that indicate at a coarse level what sites a particular child may enter, and at a fine level what functions and/or areas (e.g., chat, image galleries, etc.) the child may access within the site. A parent may choose to allow or disallow a particular type of function regardless of the actual site being accessed.

I-cards may be issued and may be available to users, for instance, as downloadable links. A Token Service may be implemented that generates security tokens as requested by the selector when the user attempts to use the issued card at a relying site. Commercial Token Service offerings have been announced by IBM Tivoli and others.

Just as a browser can read web pages from any web server, a selector can collect i-cards. At each site, the user may be authenticated and his/her claims verified using whatever method that site chooses to employ. Once satisfied, the site generates an i-card that the user imports into their selector by clicking a download link.

In the case of the managed i-cards, it is important to understand that the card itself contains only metadata (a description of other data)—not the actual claim values. The managed card is an XML document with elements that include the name of the card, the background image of the card, and the set of the types (but not the values) of attributes supported by the card and its associated token service endpoint. An i-card could, for example, indicate that it supports the claim types of first name, last name, postal code, and email address. More to the point, the card might hold a claim type whose Boolean value is the truth of the statement that the card holder is less than 16 years of age.

Instead of relying on usernames, passwords and form filling, sites that accept i-cards rely on digitally signed tokens provided by the user's selector. To request such a token, the site displays an icon on the home page (or any other page where data is needed). In one implementation, the icon may include a small box with a small letter "i," position in the box. The box and text might be purple in color with the text being an italicized font. Of course, it will be appreciated that any icon or indicia may be used for users to identify with an i-card. Different shapes, colors and fonts may be used for the icon or indicia.

When the user clicks on this icon, their i-card browser extension retrieves an HTML or XML description of the site's policy specifying the set of required and optional claims it needs. The browser then opens up the user's selector in a window showing only the card(s) whose set of supported claim types is the same set (or a superset) of the claims requested.

The user selects one of the cards by clicking on it and authenticates to the card as required (e.g., by entering a PIN). The selector sends the authentication materials to a token service (typically co-resident with the data systems supporting the card issuing website). The token service returns a token that is signed using encryption keys derived from the SSL domains of both the relying site and the issuing site. The selector then POSTs this token to the relying site.

For example, if the relying site had requested a Boolean claim as to whether the user was less than 16 years of age, and the user selected a card that supported this claim type and the user was properly authenticated to submit it, then the relying site would receive that Boolean value in a digitally signed token from the issuing site. By verifying the signature, the relying site can now trust this assertion to the extent that it trusts the issuing site.

Websites and other online businesses may use the child's i-card to allow or disallow access to pages and functions of the site.

If a social networking site were to become i-card compatible, the site would display the icon/button at any page gating entrance to age-restricted areas. When the child clicks on this icon, the selector appears and the previously issued i-Card will be displayed within it. If this is the first time an i-card icon has been clicked on in the current browser session then the child may, depending on security settings and preferences, have to enter a "master" password before the selector window will appear. The child clicks on this i-card and enters their personal PIN number to unlock it. If the parent, using parental controls, has designated that the child should have access to this area of the social networking site, then the child may be granted access.

The parent's account on the registry not only provides the linkage between their own identity and that of their children, but also provides a rich set of parental control pages that indicate at a coarse level what sites a particular child may enter, and at a fine level what functions and/or areas (e.g., chat, image galleries, etc.) the child may access within the site. Consider now the detailed sequence of steps when a child clicks on the i-card icon on the hypothetical social networking site.

As described earlier, on the backend system "behind" this icon is social website's policy describing the set of claims it requires in order for a visitor to enter. It may be assumed that there is a section of the site appropriate only for children less than 16 years old. Embedded in the page containing the i-card icon would be a special object tag that contains a parameter whose URI would be "age-less-than-16."

After a child's selector displays the i-Card and the child clicks on it and enters his PIN, the selector requests a token from the token service associated with the card. We will assume that the WS-Trust protocol is being used between the selector and the Security Token Service (STS). The child's PIN number, along with the set of required claims, the relying site domain, and other information is sent in a Request for Security Token (RST) message to the STS.

The STS may be linked with the account records of the registry. If this is the first time that the child has attempted to enter this section of the social Web site, then the parent may be notified (e.g., via email, SMS or IM) of the attempt.

This notification will include a link to the parental control page for the child. The parent can choose to approve access to this site and specify permissions for specific areas or functions of the site. The parent's preferences and approvals, along with the values of the age-related Boolean claim, are encoded as the values of the claims in a SAML token that the STS signs and returns to the selector as its Request for Security Token Response (RSTR). The selector then POSTS the token to the social networking site, where it is validated and used to allow or disallow access to pages and functions of the site. If parental notice and consent had not already been set up, the original RST message would time out and the child would be told in a message box to try again later after his parent has had a chance to respond.

Of course, it will be appreciated that use is an i-card is merely one type of universal identity credential used for authentication purposes that may be used, and that other such universal identity credential may also be used in keeping with the scope of the invention.

The third party requestor module 150 may be configured to provide tools to enable one or more entities to verify identity and age-appropriate information against entries in the registry database 125. The requesting entity may include, for instance, an individual person, business, company, corporation, partnership, or any other organization. For instance, an individual, company or other entity may seek to know whether one or more persons are registered, and whether registered persons are subject to an age-restriction. This may be advantageous, in particular for websites and other online content providers, such as virtual worlds, chat room, social networking sites, etc. Third party requestors may set up an account with the registry provider 60 to request information.

Account manager 151 may be configured to enable third party requestor to set up an account. Third parties account information may be stored in the third party account database, which stores account information. Account information may include name and contact information of each third party requestor, payment accounts, age-restriction policies, etc. Other information may also be provided such as preferred output type for data. In some implementations, a fee may be charged for registration verifications.

A billing system 152 may be configured to monitor information requests and charge the third party's account accordingly. The fees may vary depending on the third party requestor, information sought, the complexity of the request, the number of requests, time to process, data output types, and/or other contractual fee service basis. Other fees structures are also possible. Different payment plans may be provided for different users.

Subscribing members may have at least three ways to use the service: 1) compare subscriber registrations against the registry on an as needed basis, in substantially real-time, 2) batch process (past or ongoing registrants), or 3) with a "push" method to be processed by the subscribing client within their own operating environment.

The identity request and age-verification processing module 160 may be configured to provide identity and age-appropriate verification registry to third party requestor having an account. This may include verification that one or more persons are registered and whether registered persons and that they are age-appropriate.

For instance, the system may enable a third party requestor 50 to query (or otherwise search) the registry database 125 to determine if a particular individual is registered. In some cases, the third party requestor 50 may provide an identifier for the individual, which it has in it position. If the individual is determined to the registered in registry database 125, the identity request and age-verification processing module 160 may be configured, in some instances, to provide: (a) an indication to the requesting entity whether the registered individual is or is not of a sufficient age to access information, a service or a product of the requesting entity, and/or to disclose information which could be shared or become publicly available by the requesting entity; and/or (b) the age, age range, or date or birth of the registered individual to the requesting entity.

Other information may also be confirmed and/or verified. Verifiable parental consent or verified information may also be requested for an individual.

Requests may be made, and processed electronically. Requests may be made in a suitable format for processing by request processing module 140. For instance, requests may be formatted in Structured Query Language (SQL) or Extensible Markup Language (XML) for querying the registry database 125. Other processing may be provided to convert other query languages into a common format for processing. These may be important for batch processing. With a verification of an account, processing may commence, and the requestor billed accordingly. The third party requestor 50 may provide data to compare to data stored in the registry database 125. In some instances, transferred data, may include hashed data, using a known hash function for speeding up data look-up and comparison and heightened security and privacy.

Of course, requests may also be made by other means. For instance, a requestor may contact the registry operator 60 via telephone for confirmation. An automated (or human) operator may make a proper verified authentication of an account holder, processing may commence, and the requestors billed accordingly.

Verification of an Individual in the Registry Database

The third party requestor 50 may request to determine that an individual is in the registry. For instance, the third party requestor 50 may have information regarding an individual, such as, for example, one or more of: a name, phone number, address, email address, IM screen name, or Social Network screen name(s). These may be compared with the registry database to determine a match. Of course, the more fields compared, the greater the likelihood that the individual is in fact registered. This may be a simple Boolean operation (i.e., yes or no response). The third party requestor 50 may require the registry operator 60 to maintain information provided.

Verification of Age for an Individual in the Registry Database

In addition to confirming that an individual is in the registry database, the requestor may make a request to confirm that the individual is above or below a certain age. A third party requestor may or may not have the date of birth or age of a person registering. For instance, the inquired age could be an age or majority (e.g., 18), drinking age (e.g., 21), user-age range restrictions set by a content provider's terms of service (TOS) agreements (e.g., over the age of 13 for many popular social networking sites), or other age-critical criteria, such as, for example, driving age, age of consent, age for certain insurance premiums or rates, etc.

Age verification may be determined from comparison of the purported age or date-of-birth with a stored age or date-of-birth for a registered individual. This may be a simple Boolean operation, thus quickly confirming or disproving the purported age or date-of-birth which the third party requestor may have for the individual.

Although, in some implementation, the date of birth (DOB) or derivative information, such as, for example, the number of days, month, years, etc. above/below a certain age, may be returned.

Verification that parent data provided by the child to a third party requester 50 is registered and verified by the registry operator 60.

Verification that a Parent has Given Consent for an Individual in the Registry Database to Access Site or Service, Deliver Personal Data and/or View Content.

A requestor may query the registry database 125 to find out whether an individual has been given permission by a parent to view the content, share information, or participate in a service of their website. If so, the identity request and age-verification processing module 160 may also provide "verifiable parental consent." Website then can reasonably rely on the consent of parent to provide the individual access to its content or service or ability of the child to deliver personal information. Of course, if the individual is in the registry database, and no consent has been given (or consent has been deny), the website might choose to deny access to the individual of its content.

In some instance, the requesting entity may request from the registry confirming of one or more credentials, as well as, the methodology or techniques used for verification of the credential information associated with an individual. As such, requesting entities can determine, for themselves, whether to conduct additional inquiry. However, a third party may commence with its own independent verification techniques, and/or request the registry operator to provide additional verification of credentials of an account holder. In some instances, verifications from multiple third parties may be collected by the registry operator for later use.

Children might also identify themselves through the use of a verifiable offline or online ID. Depending on age and terms of use (TOU) from the verifiable ID provider the parent could then be notified. The registry provider 60 may also provide the child with a verifiable online ID.

The various notifications may be transmitted by various communication means. In one implementation, notifications may include an electronic link in an email that allows the receiver to link to a website associated with application 110.

In some implementation, persons who believe they may were wrongly added to the registry, can request the registry provider 60 to be removed from the registry. If it turns out that fraud was committed, the user(s) who did the wrong may be penalized (e.g., account or registration cancelled), and/or the proper authorities notifies (e.g., police, FBI, etc.).

As users, and as especially children age, they may grow out of the custodial relationship. In one implementation, the system may recognize when a child becomes an adult, and provide notification to the child with an offer to prove adult status by submitting a credential. Once the child does, the child's account may be transferred to an adult status, removing age-restrictions and/or parental controls. Parental controls could be removed after 13 and at different ages along the growth path. Meaning they would not necessarily have to be an adult to remain in the registry without parental control.

Figure 2:
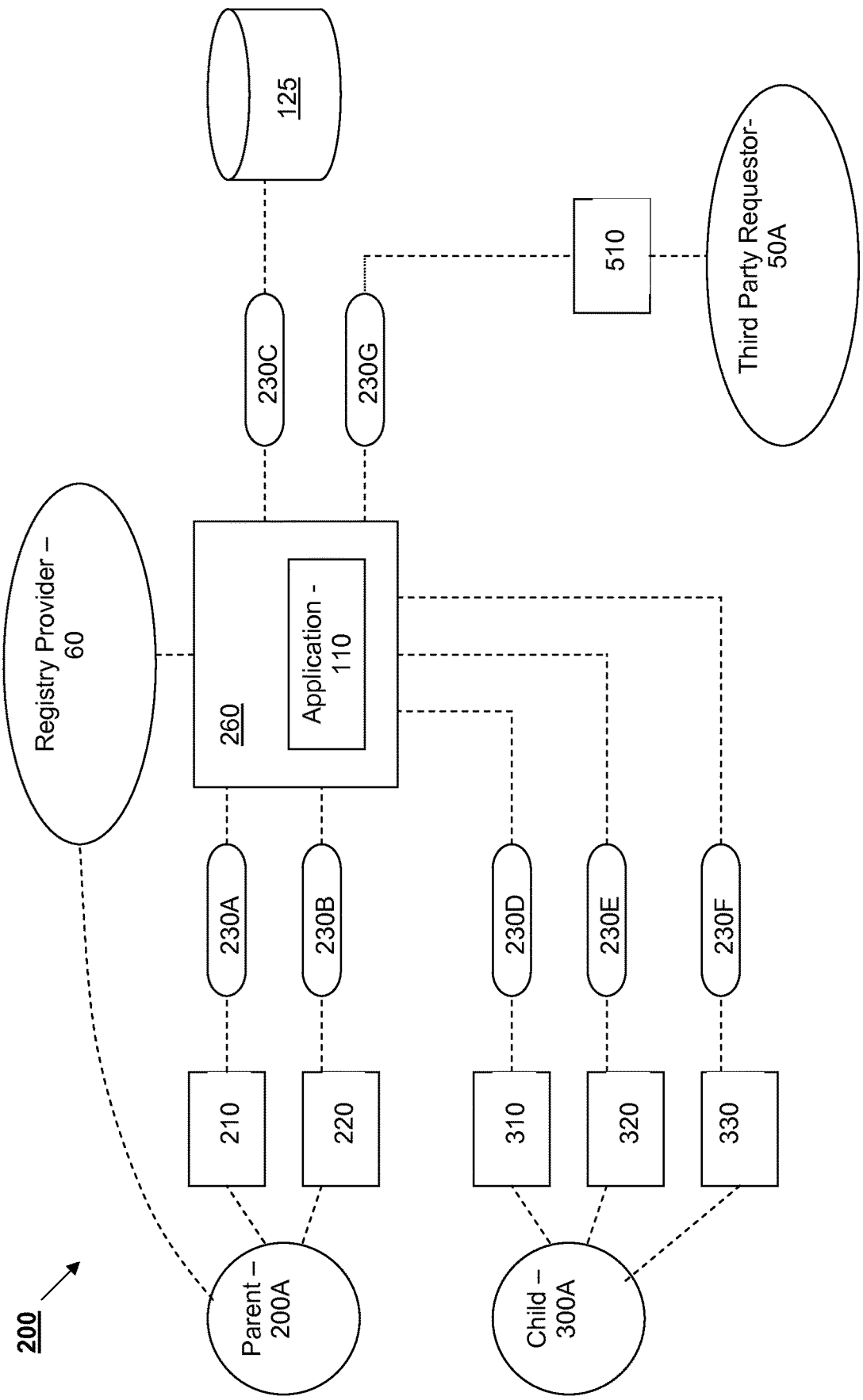
FIG. 2 is an exemplary system for providing identity and age-appropriate verification registry.

FIG. 2 is an exemplary system 200 for providing identity and age-appropriate verification registry.

Application 110 may reside on a server 260 maintained by the registry provider 60. Server 260 may host the application 110, which may, in some implementations, require users to access the server 260 over one or more networks 230A-G (or other connections) to interface with and use the application 110. Registry database may be local to server 260 or may interface with server 260, for example, via a network 230C.

In some implementations, a user may download the software for interfacing the application 110 from the server 260, with program updates made available (over the network or the Internet) as needed, or on a predetermined, regularly-scheduled basis. The application 110 may be operated in a Microsoft Windows® operating environment. However, other operating systems and environments (e.g., UNIX, Java, Linux, and proprietary systems, such as Apple Mac OS X) are also envisioned.

In other implementations, the application 110 may be a "plug-in" application that is incorporated into a third-party software application or website applications. Other configurations may be also implemented. For instance, application 110 may "plug-in" to a third party's website registration or other login and registration portals for creating accounts and accessing content.

Registry provider 60 may be an individual, company, or other entity. In some implementations, registry providers 60 may provide data entry functions or other support. Registry provider 60 may receive various communications from parents, children, third party requestors, other parties, etc., in a variety of means, including electronic communication and non-electronic communications. Registry provider may operate (or be affiliated) with a mail center or call center for automatically or manually processing mail, email, telephone calls, or other communications.

A parent 20A may interface with application 110 with one or more networked devices 210, 220 via networks 230A, 230B. Networks 230A, 230B may include local area network (LAN), wide area networks (WAN), the Internet, or other data networks. Cellular and telephone networks may also be used. In one implementation, device 210 may be a personal computer (PC) at the parent's house or work and the network 220 may provided by a broad band Internet connection (e.g., cable, fiber optics, DSL, or other network system). On the other hand, device 220 may be a cellphone or personal data assistance (PDA) cellphone, which may provide cellular capabilities and/or Short Messaging Service (SMS)—such as text messaging—via network 230B. It will be appreciated that other communication devices may be used, such as, telephone, fax machine, etc. Device networking may be provided via packet-switched networks and protocols such as, for example, one or more of WiFi, WiMax, Internet Protocol (IP) v.4, IP v. 6, public switched telephone networks (PTSN), integrated services digital network (ISDN), etc. While wireless networks may be preferred for greater remote access, it will be appreciated that wired systems might also be utilized. Some devices 210, 220 may be capable of connecting to multiple networks. Devices 210, 220 are not intended to be limiting.

Other non-electronic communication methods may also be used by parent 20A. These may include, for instance, mail service via the U.S. Postal Server or similar carrier. Parent 20A might mail a registration form or consent information to registry provider 60 who then enters the corresponding information into the registry database 125. Registry provider 60 may send information to parent, for instance, based on the preference of the particular parent 20A. For instance, one parent may wish notification to be sent via email, while another parent may request notification by text message.

Similarly, a child 30A may interface with application 110 with one or more networked devices 310, 320, 330 via networks 230D, 230E, 203F. These may include the same types of devices and networks which the parent may have used. A child 30A, for instance, may wish notification to be sent via email, text message, or instant messenger (IM) via devices 310, 320, 330, respectively.

A third party requestor 50A may interface with application 110 also. While not shown in FIG. 2, other interested parties 40 (FIG. 1) might similarly be connected to the application 110 via network 230G. Parents 20 and children 30 may alternatively or additionally access application 110 through the site of another interested parties 40.

Figure 3:
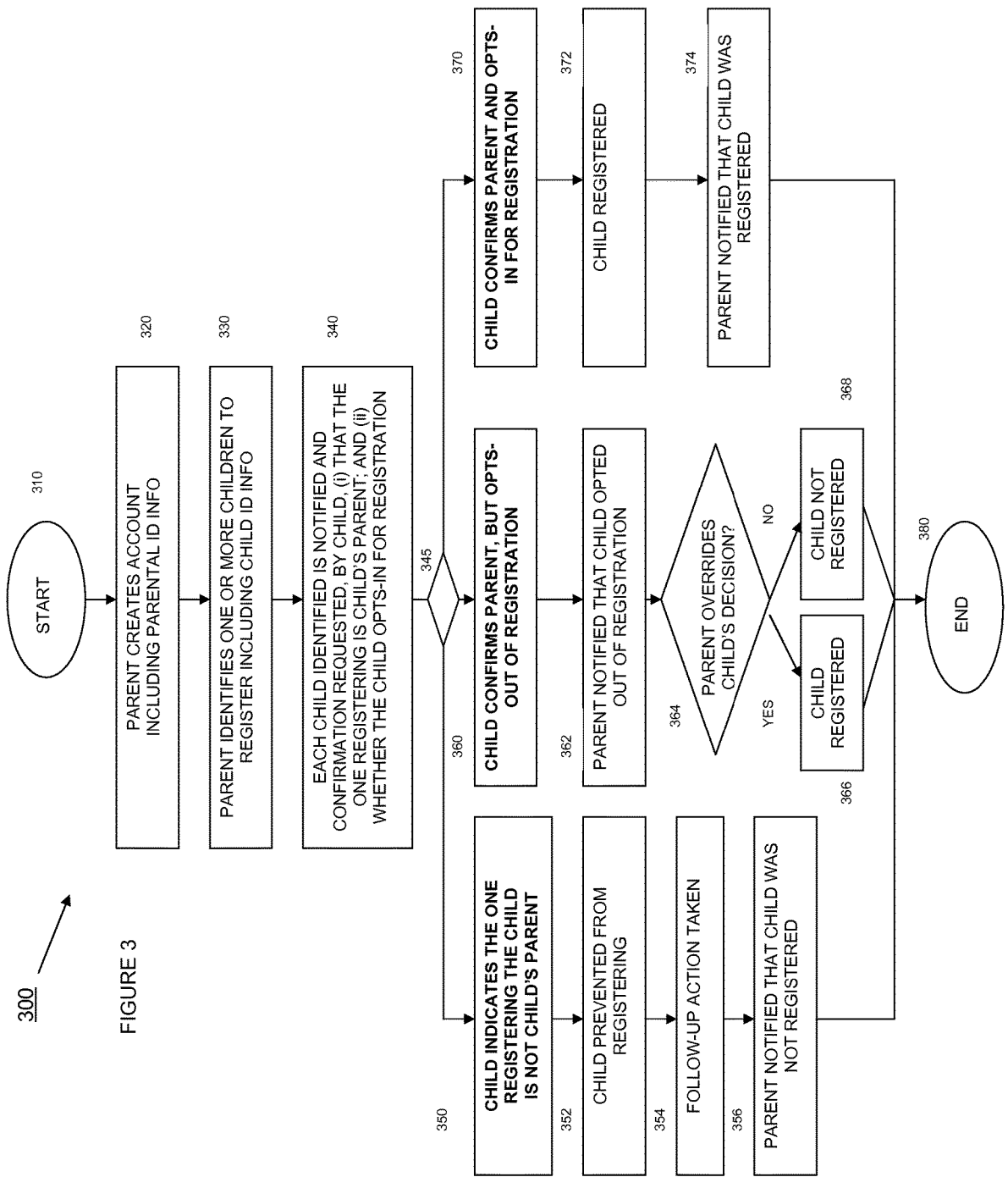
FIG. 3 is a flow chart of one exemplary parent-initiated registration process.

FIG. 3 is a flow chart of one exemplary parental-initiated registration process 30. Registration process 30 may be performed online. However, it will be appreciated that the registration process might also be initiated, additionally or alternatively, fully or in-part, for example, by telephone, cellphone, PDA, or by mailing or faxing a registration form, to the registry provider.

The process begins in step 310. In step 320, a registering parent creates (or modifies) an account (record) including parental identification information. Detailed instructions may be provided to the registering parent to input contact and notification information. Various data entries fields and/or boxes may be displayed to facilitate data entry. For instance, various identity providers may be provided as options for parent to facilitate data entry and authentication to the application 110. In some implementations, a fee may be required for setting up an account and registering a child.

To minimize fraud or unauthorized users, parental verification may be required and the parent is requested to provide an identity and consent credential. Verification of the identity and consent credential may include verification of a social security number, account by a bank or financial institution, verification of parent by a credit bureau, verification or driver's license, or verification of another worthy verifying parameter. In some implementations, the parent may be given only a limited time to provide the credential, such as, within one day, week, month, etc.

Next, in step 330, the registering parent identifies one or more children and includes child identification information. Again, detailed instructions may be provided to the registering parent to input contact and notification information for a child. Various data entries fields and/or boxes may be displayed to facilitate data entry.

In step 340, each child identified by the registering parent is notified that he/she has been identified by a parent and requests confirmation, by child, (i) that the requestor is parent and (ii) whether to participate ("opt-in").

For instance, the child may be prompted with dialog boxes, such as, "Is this person your parent?" and if answered in the affirmative, subsequently "Do you wish to be registered?" The child may have the opportunity to confirm each via request via an input selection. The child's decision(s) are input in step 345. Other dialogs and requests may be possible.

Step 350: Child indicates that the one registering child is not the child's parent. If so, child may be (i) prevented from also accepting participation in step 352. Because, parental status is questionable in this situation, it may be indicative of fraud or an unauthorized user (not parent). Further follow-up action may be taken in step 354. For instance, a notice may be provided to the child to notify his/her parent immediately of the suspect activity, and if there already is an account established for a parent of the child, that parent may be similarly notified. In step 356, a notification may be sent to the persons registering the child that the child was not registered.

Step 360: Child confirms parent, but indicates that he/she does not wish to register. Thus, the child voluntarily "opts-out."

In such a case, in step 362 the parent may be immediately notified that the child opted-out from registration. The parent may then have the option, in step 364, to override the child's decisions with proper verification of the parent's identity and consent credentials. If provided, in step 366, the child's decision is overridden, and the child is registered. Of course, the parent might respect the wishes of the child, and the child will not be register in step 368.

Step 370: Child confirms parent and indicates that he/she (the child) wishes to register (i.e., opts-in). In step 372, a registration account (record) may be created for that child. The child may also be given the opportunity to enter additional (and/or edit) identifying information. In step 374, the parent receives notification that the child opted-in. The process ends in step 380.

Figure 4:
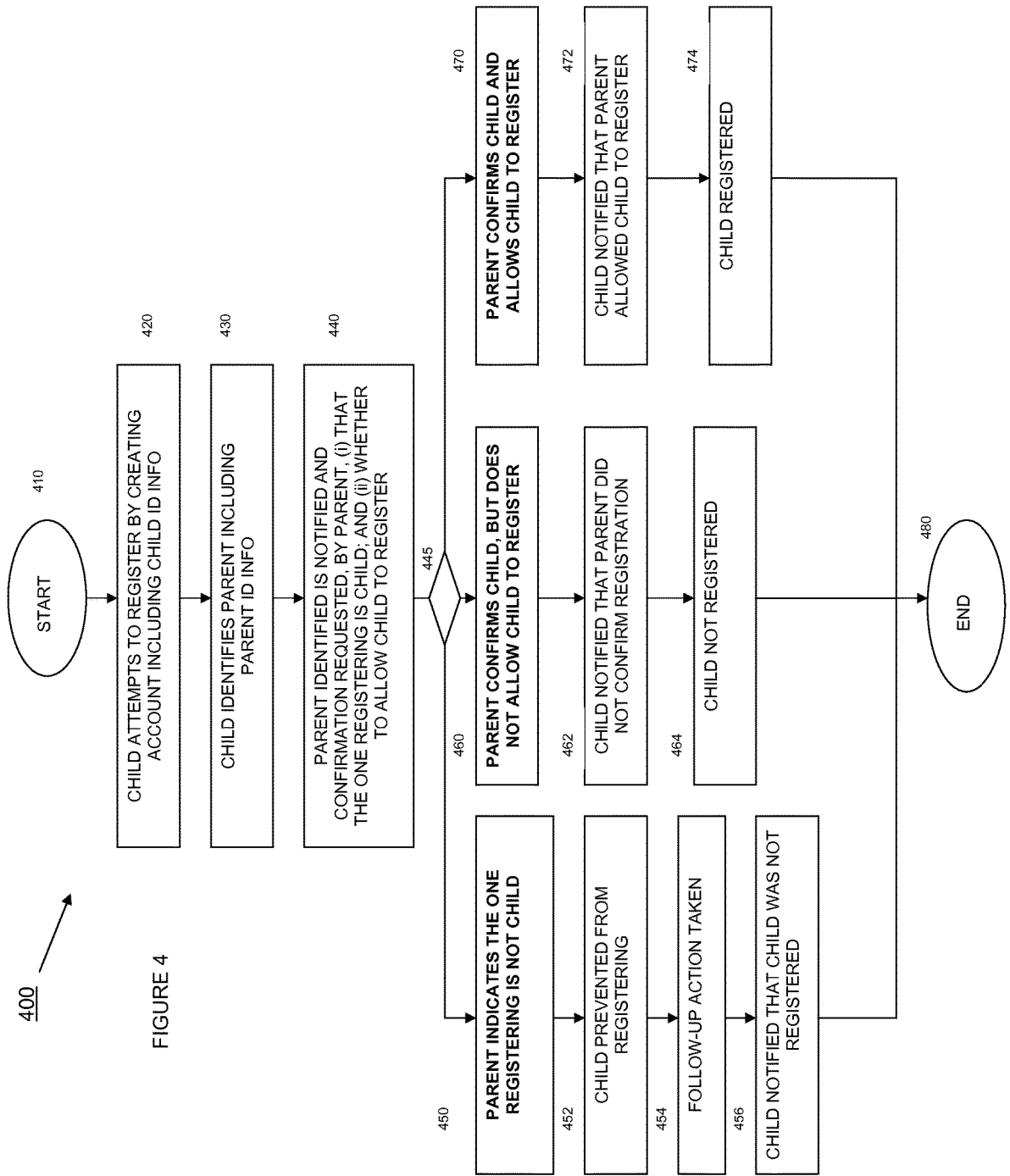
FIG. 4 is a flow chart of one exemplary child-initiated registration process.

FIG. 4 shows a flow chart of one child registration process 400. Registration process 400 may performed online. However, it will be appreciated that the registration process 400 might also be initiated, alternatively or additionally, fully or in-part, for example, by telephone, cellphone, PDA, or by mailing or faxing a registration form, to the registry provider. Other dialogs and requests may be possible.

The process begins in step 410. In step 420, a child attempts to register by creating an account including child identification information. Registration may be subject to parental approval.

Detailed instructions may be provided to the registering child to input contact and notification information. Various data entry fields and/or boxes may be displayed to facilitate data entry.

Next, in step 430, the registering child identifies a parent and includes parent identification information. In some instance, alternatively or additionally, the registering child may also provide information regarding one or more other parties, which may be contacted during the registration process in order to verify information of the child, such as identity or age. This could be a teacher or school, for example. Again, detailed instructions may be provided to the registering child to input contact and notification information for a parent. Various data entry fields and/or boxes may be displayed to facilitate data entry.

In step 440, each parent identified by the registering child is notified that he/she has been identified by a child and requests confirmation, by parent, (i) that the requestor is his/her child and (ii) whether to allow the child to register ("opt-in").

For instance, the parent may be prompted with dialog boxes, such as, "Is this your child?" and if answered in the affirmative, subsequently "Do you wish to have your child to register?" The parent may have the opportunity to confirm each via an input selection. The parent's decision(s) are input in step 445.

Step 450: Parent indicates that the one registering is not child, and that child is prevented from registering. Thus, the child will not be registered in step 452.

Because, the child's status is questionable in this situation, it may be indicative of fraud or an authorized user. Further follow-up action may be taken in step 454. And, in step 456, a notice may be provided to the child to notify his/her parent immediately of the suspect activity.

Step 460: Parent confirms child, but does not allow child to register. Thus, the parent has overridden the child's decision. In step 462, the child may be immediately notified that the parent did not allow child to register. And, in step 464, the child will not be registered.

Step 470: Parent confirms child and allows child to register. In step 472, the child receives notification that the parent allowed the child to register. Next, in step 474, a registration account may then be created for that child. The parent may have the opportunity to set up a parent account and may have the opportunity to enter additional (and/or edit) identifying information about themselves and the child. The process ends in step 480.

Figure 5:
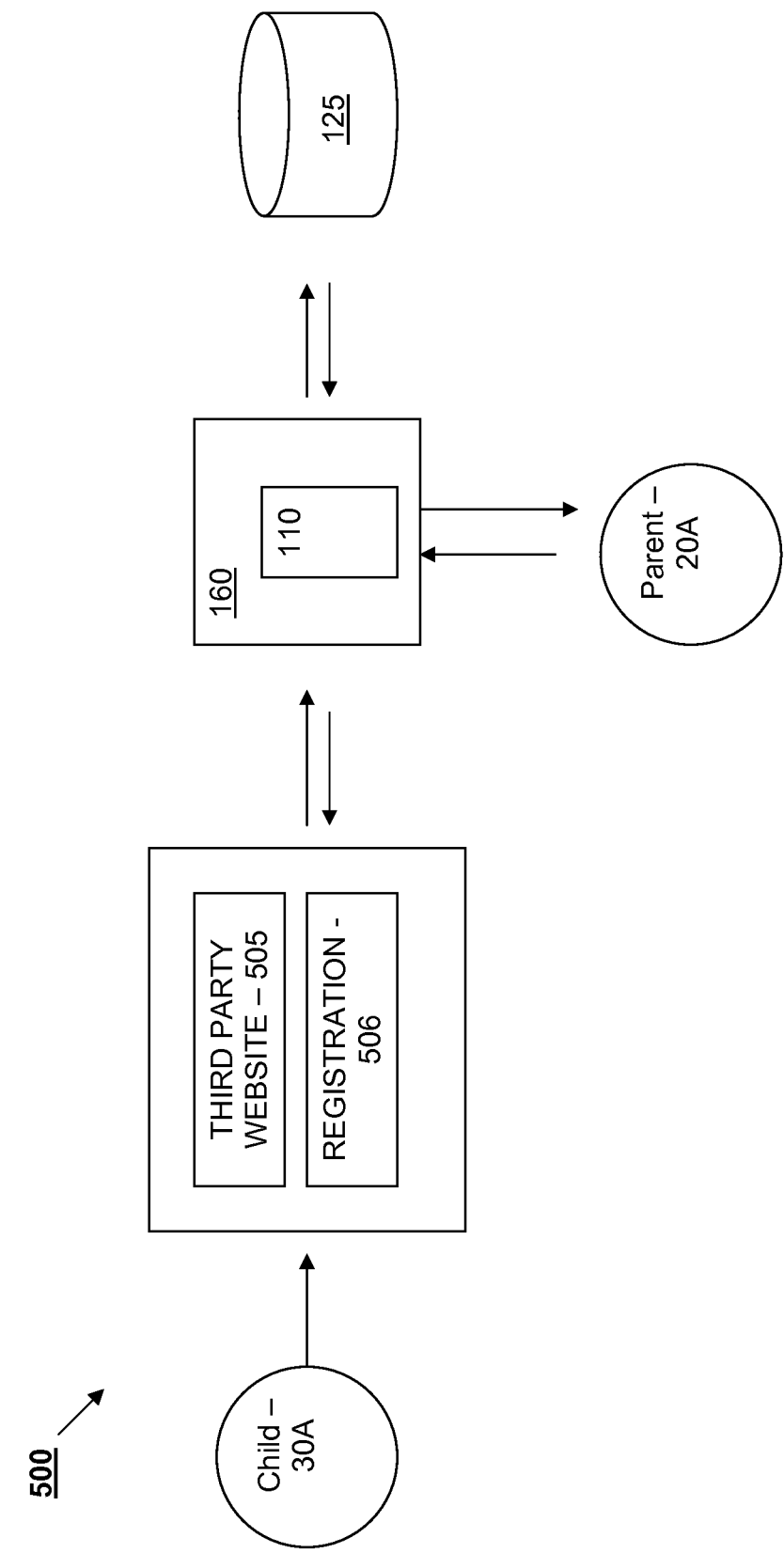
FIG. 5 is schematic showing an exemplary third party request verification process for identification and age-content of an individual.

FIG. 5 is schematic showing an exemplary third party request verification process 500 for identification and age-content of an individual.

An individual, in this case, a child 30A, may attempt to register at a third party website 505 (or other online content provider). During the registration process, information may be requested from the child 30A.

The website 505 may have no idea that child 30A might be too-young to enter site or service or to view content or share information, and/or a parent may not want child to enter site or service. The child could, for example, provide erroneous age information.

The website's registration module 506 may interface with application 110, to make a request for verification against the registry database 125. Depending on the request by the website, the identity request and age-verification processing module 160 of application 110 may provide verification of an individual and/or provide verification of age-sensitive information for an individual.

For instance, is the individual over or under a certain age? This could be an age or majority (e.g., 18), drinking age (e.g., 21), or other age-critical criteria. For instance, driving age, age of consent, age for insurance premiums or rates, etc. Age verification may be determined from comparison of the stored date-of-birth, or age associated with a registered individual. This may be a simple Boolean operation. Although, in some implementations, age, age-range, the date of birth or derivative information, such as, for example, the number of days, month, years, etc. above/below a certain age may be provided to the requesting entity.

In some instances, third party requestor 50A may specifically inquire about an individual, who purports to be an adult (but could in fact be a child who falsified his or her age). If the individual is registered, the third party requestor 50A may be able to confirm the identity and age of that individual via the identity request and age-verification processing module 160 of application 110. Moreover, the requesting entity may be able to view identity and/or consent credentials for that individual. The third party requestor 50A thus has a greater assurance that the individual is (or is not) an actual adult. On the other hand, if after querying the registry, the individual is not determined to the registered, the third party requestor 50A may assume, and/or have some level of assurance, that the individual is a not a child (based on the assumption that a unregistered individual is likely not to be a child since a parent did not bother to register him or her). This may be referred to as "no-action" level of assurance because the requesting entity "pinged" for an independent answer.

In other instances, the third party requestor 50A may specifically inquire about an individual, who purports to be a child (but could in fact be an adult who falsified his or her age). This could be predatory adult who seeks access to children and/or their personal information. If the individual is registered, the third party requestor 50A may be able to confirm the identity and age of that individual via the identity request and age-verification processing module 160 of application 110. Moreover, via the identity request and age-verification processing module 160 of application 110 may be able to view identity and/or consent credentials for the register individual. The third party requestor 50A thus has a greater assurance that the individual is (or is not) an actual child. On the other hand, if after querying the registry, the individual is not determined to the registered, the third party requestor 50A may assume, and/or have some level of assurance, that the individual is a not a child (since a parent did not bother to register him or her). The third party requestor 50A may choose to block such individuals from accessing the site or content, which may place that individual in contact with children or their personal information.

If the child 30A is verified to be registered in registry database 125, the parental management module 140 may also notify the parent 20A. Parent 20A can have knowledge that child is attempting to enter website 505 (unbeknownst to the child). If prior consent was previous given, the parent 20A may not have to do anything further. However, the parental management module 140 may enable the parent 20A to allow or deny access to their child 30A. This information may be provided to the third party requestor 50A.

The third party website 505 may have, in some instances, prior notification (and knowledge) to grant or block access to the child 30A from registering or access. Thus, no additional inquiry via the identity request and age-verification processing module 160 may be necessary before doing so.

In some instances, the "parent" may be "adult" (i.e., over the age of 18)—typically in most cases. However, it will be appreciated that a "parent" need not necessarily have achieved the age of majority to have parental access/use abilities of the system. In some other instances, the parent might be a step-parent, foster parent, legal guardian, or other custodian on behalf of a child.

Moreover, a "child" need not necessary be a minor child. For instance, the child might be an adult, but be disabled or have special needs (e.g., mentally challenged), thus still requiring parental help or supervision. Moreover, the adult child may be living with, and/or subsiding with support of a parent, and may be subject to parental "rules" nonetheless.

While the above disclosure has been described primarily with respect to a parent/child custodial relationship and distribution and access to personal identifying and age-sensitive information, it will be appreciated that aspects of the invention may be used for other types of custodial relationships in keeping with the scope of the invention. For instance, one party may seek to prevent harm to another party (or parties) by their access to inappropriate content for that person and/or and possible sharing of personal information to a third party which could become public. Exemplary relationships may include, for instance, teacher/student, guardian ad litem/ward, employer/employee, clergy member/parishioner, adult/elderly parent, parole officer (court designee)/felon (especially, registered sex offenders), as well as other managerial, supervisory, custodial and/or guardianship relationships.

Other embodiments, uses and advantages of the inventive concept will be apparent to those skilled in the art from consideration of the above disclosure and the following claims. The specification should be considered non-limiting and exemplary only, and the scope of the inventive concept is accordingly intended to be limited only by the scope of the following claims.

What is claimed is:

1. A non-transitory computer-readable media comprising instructions that, when executed by one or more processors, cause operation comprising:

receiving a first request from a first individual to register a first account for the first individual in a registry, the first individual being (1) a guardian or a legally responsible party for a second individual or (2) an entity acting on behalf of the guardian or the legally responsible party for the second individual;

receiving information regarding the second individual with the first request or responsive to the first request being received, the information regarding the second individual including (1) first information identifying one or more computing devices associated with the second individual and (2) second information conveying one or more of an age of the second individual, a date of birth of the second individual, or an indication of whether the second individual is a minor or is an adult in a protected or vulnerable demographic;

providing a notification from a registry system to the second individual to confirm registration of the first individual in the registry, the notification conveying a relationship between the first individual and the second individual as well as a message that describes and/or enables protecting personal information associated with the second individual;

receiving a second request from the second individual confirming registration of the first individual, in order for (1) the first account to be registered for the first individual and (2) a second account to be registered for the second individual, the second account storing the information regarding the second individual;

responsive to device identifying information related to the second individual being received by an online service, receiving a request at the registry system from an entity associated with the online service to determine whether the second individual is registered with the registry, wherein the request includes the device identifying information;

querying the registry to determine whether the second individual is registered with the registry based on the device identifying information and the stored information regarding the second individual; and responsive to a determination based on the query that the second individual is registered with the registry, providing an indication to the requesting entity whether the online service is or is not allowed to provide access to age-restricted content to the second individual.

2. The media of claim 1, the operations further comprising creating a "parent" or "guardian" account as the first account for the first individual, and/or a "child" or "ward" account as a second account for the second individual.

3. The media of claim 1, the operations further comprising: (i) receiving a request from the second individual to register the second account in the registry, (ii) receiving information regarding the first individual, and (iii) generating a notification to the first individual to confirm registration.

4. The media of claim 1, the operations further comprising receiving an additional request from the first individual to register the second individual responsive to the second individual not consenting to be registered or failing respond to the notification to confirm registration.

5. The media of claim 1, the operations further comprising:
determining, based on the query, whether the device identifying information matches information identifying at least one computing device of the one or more computing devices associated with the second individual;

responsive to the device identifying information matching the information identifying the at least one computing device, obtaining the second information based on the information identifying the at least one computing device; and generating, based on the second information, the indication of whether the online service is or is not allowed to provide access to the age-restricted content to the second individual.

6. The media of claim 1, the operations further comprising transmitting a request for a registered individual to provide one or more credentials to the registry, to confirm (i) an identity of the registered individual and/or (ii) the registered individual has authority to provide consent for another registered individual.

7. The media of claim 6, wherein the one or more credentials comprise one or more of identity-based credentials, knowledge-based credentials, control-based credentials, or contextual-based credentials.

8. A method comprising:
maintaining, by one or more processors, within a registry system, a first account and a second account, the first account being associated with a first individual, the second account being associated with a second individual, the first individual being (1) a guardian or a legally responsible party for the second individual or (2) an entity acting on behalf of the guardian or the legally responsible party for the second individual, wherein the registry system stores information regarding the second individual in association with the second account;

responsive to device identifying information related to the second individual being received by an online service, receiving, by one or more processors, a request at the registry system from an entity associated with the online service to determine whether the second individual is registered with the registry, wherein the request includes the device identifying information;

querying, by one or more processors, the registry to determine whether the second individual is registered with the registry based on the device identifying information and the information regarding the second individual, the information regarding the second individual including (1) first information identifying one or more computing devices associated with the second individual and (2) second information conveying one or more of an age of the second individual, a date of birth of the second individual, or an indication of whether the second individual is a minor or is an adult in a protected or vulnerable demographic; and responsive to a determination based on the query that the second individual is registered with the registry, providing, by one or more processors, an indication from the registry system to the requesting entity whether the online service is or is not allowed to receive personal information of the second individual.

9. The method of claim 8, further comprising: (i) receiving a request from the requesting entity including a purported age, age-range, or date of birth of an individual, (ii) comparing the purported age, age-range, or date of birth with a stored age, age-range, or date of birth associated with a registered account for that individual, and (iii) providing an indication to the requesting entity that confirms or disproves the purported age, age-range, or date of birth for that registered individual.

10. The method of claim 8, further comprising receiving, by one or more processors, a request, from a registered individual, that authorizes or denies the registered individual or another registered individual to access information, a service, or a product of an entity, and/or to disclose personal information of the registered individual or the another registered individual.

11. The method of claim 10, further comprising providing, by one or more processors, a notification to at least one entity that the registered individual or the another registered individual have been granted authorization to, or denied authorization to, access information, a service, or a product of the at least one entity, and/or to disclose personal information of the registered individual or the another registered individual.

12. The method of claim 10, further comprising receiving, by one or more processors, a request, from the requesting entity, to determine if the registered individual has been granted authorization to, or denied authorization, to access information, a service, or a product of an entity, and/or to disclose personal information of the registered individual.

13. The method of claim 8, further comprising:
determining, by one or more processors, based on the query, whether the device identifying information matches information identifying at least one computing device of the one or more computing devices associated with the second individual;
responsive to the device identifying information matching the information identifying the at least one computing device, obtaining, by one or more processors, the second information based on the information identifying the at least one computing device; and
generating, by one or more processors, based on the second information, the indication of whether the online service is or is not allowed to receive personal information of the second individual.

14. The method of claim 13, further comprising providing, by one or more processors, an indication to the requesting entity that stored credential information associated with the device identifying information was verified by a registry operator of the registry system or its agents.

15. The method of claim 14, further comprising providing, by one or more processors, an indication to the requesting entity as to a methodology or technique used for the verification of the credential information associated with the device identifying information.

16. A non-transitory computer-readable media comprising instructions that, when executed by one or more processors, cause operation comprising:
maintaining, within a registry system, a first account and a second account, the first account being associated with a first individual, the second account being associated with a second individual, the first individual being (1) a guardian or a legally responsible party for the second individual or (2) an entity acting on behalf of the guardian or the legally responsible party for the second individual, wherein the registry system stores information regarding the second individual in association with the second account;
responsive to device identifying information related to the second individual being received by an online service, receiving a request at the registry system from an entity associated with the online service to determine whether the second individual is registered with the registry, wherein the request includes the device identifying information;
querying the registry to determine whether the second individual is registered with the registry based on the device identifying information and the information regarding the second individual, the information regarding the second individual including (1) first information identifying one or more computing devices associated with the second individual and (2) second information conveying one or more of an age of the second individual, a date of birth of the second individual, or an indication of whether the second individual is a minor or is an adult in a protected or vulnerable demographic; and
responsive to a determination based on the query that the second individual is registered with the registry, providing an indication from the registry system to the requesting entity whether the online service is or is not allowed to receive personal information of the second individual.

17. The media of claim 16, the operations further comprising: (i) receiving a request from the requesting entity including a purported age, age-range, or date of birth of an individual, (ii) comparing the purported age, age-range, or date of birth with a stored age, age-range, or date of birth associated with a registered account for that individual, and (iii) providing an indication to the requesting entity that confirms or disproves the purported age, age-range, or date of birth for that registered individual.

18. The media of claim 16, the operations further comprising receiving a request, from a registered individual, that authorizes or denies the registered individual or another registered individual to access information, a service, or a product of an entity, and/or to disclose personal information of the registered individual or the another registered individual.

19. The media of claim 18, the operations further comprising provide a notification to at least one entity that the registered individual or the another registered individual have been granted authorization to, or denied authorization to, access information, a service, or a product of the at least one entity, and/or to disclose personal information of the registered individual or the another registered individual.

20. The media of claim 16, the operations further comprising:
determining, based on the query, whether the device identifying information matches information identifying at least one computing device of the one or more computing devices associated with the second individual;
responsive to the device identifying information matching the information identifying the at least one computing device, obtaining the second information based on the information identifying the at least one computing device; and
generating, based on the second information, the indication of whether the online service is or is not allowed to receive personal information of the second individual.

* * * * *